(12) United States Patent
Tatemi et al.

(10) Patent No.: US 12,325,586 B2
(45) Date of Patent: Jun. 10, 2025

(54) PICKING SYSTEM

(71) Applicant: Daifuku Co., Ltd., Osaka (JP)

(72) Inventors: Fumiaki Tatemi, Tokyo (JP); Masaya Miyamoto, Tokyo (JP); Wataru Kiyokawa, Tokyo (JP); Kazunari Kimura, Hinocho (JP); Masashige Iwata, Hinocho (JP); Yuichi Ueda, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 490 days.

(21) Appl. No.: 17/786,791

(22) PCT Filed: Dec. 10, 2020

(86) PCT No.: PCT/JP2020/046070
§ 371 (c)(1),
(2) Date: Jun. 17, 2022

(87) PCT Pub. No.: WO2021/125046
PCT Pub. Date: Jun. 24, 2021

(65) Prior Publication Data
US 2023/0023364 A1 Jan. 26, 2023

(30) Foreign Application Priority Data

Dec. 19, 2019 (JP) ................................ 2019-229059

(51) Int. Cl.
*B65G 1/02* (2006.01)
*B65G 1/06* (2006.01)
(Continued)

(52) U.S. Cl.
CPC ............. *B65G 1/026* (2013.01); *B65G 1/065* (2013.01); *B65G 1/1378* (2013.01); *B65G 15/08* (2013.01)

(58) Field of Classification Search
CPC ...... B65G 1/026; B65G 1/065; B65G 1/1378; B65G 15/08
See application file for complete search history.

(56) References Cited

U.S. PATENT DOCUMENTS 11,034,518 B2  6/2021  Ueda et al.
2008/0181753 A1  7/2008  Bastian et al.
(Continued)

FOREIGN PATENT DOCUMENTS

CN      110525853 A   12/2019
FR      2924104 A1    5/2009
(Continued)

*Primary Examiner* — Saul Rodriguez
*Assistant Examiner* — Ashley K Romano
(74) *Attorney, Agent, or Firm* — The Webb Law Firm

(57) ABSTRACT

A picking system includes a multi-tier sorting device having ports in a plurality of tiers at different levels in a top-bottom direction, and sorts and discharges each of articles to one of the ports in the plurality of tiers; a plurality of first transport devices respectively corresponding to the ports in the plurality of tiers; and a second transport device configured to receive the articles from the first transport device and transport the articles. The second transport device has a second transport surface movable upward and downward, and, in a state where the second transport surface is located at a height corresponding to a terminal end portion of the first transport surface of one of the plurality of first transport devices, the second transport device receives the articles discharged from the terminal end portion of the first transport surface and transports the articles, with use of the second transport surface.

10 Claims, 8 Drawing Sheets

(51) Int. Cl.
*B65G 1/137* (2006.01)
*B65G 15/08* (2006.01)

(56) References Cited

U.S. PATENT DOCUMENTS

| | | | | |
|---|---|---|---|---|
| 2016/0114978 | A1* | 4/2016 | Swinderman | B65G 15/08 |
| | | | | 198/562 |
| 2018/0194567 | A1* | 7/2018 | Schnitkey | B65G 39/09 |
| 2019/0359422 | A1 | 11/2019 | Ueda et al. | |
| 2020/0071080 | A1* | 3/2020 | Wood | B65G 21/06 |
| 2021/0130095 | A1 | 5/2021 | Ueda et al. | |
| 2022/0234832 | A1* | 7/2022 | Dix | B65G 15/08 |
| 2022/0306392 | A1* | 9/2022 | Raaz | B65G 15/60 |
| 2023/0159278 | A1* | 5/2023 | Ishibashi | B65G 43/02 |
| | | | | 198/810.02 |
| 2023/0219770 | A1* | 7/2023 | Bretz | B65G 47/44 |
| | | | | 198/537 |

FOREIGN PATENT DOCUMENTS

| | | |
|---|---|---|
| IT | TO990349 A1 | 10/2020 |
| JP | 2004189417 A | 7/2004 |
| JP | 4610287 B2 | 1/2011 |
| WO | 2019225234 A1 | 11/2019 |

\* cited by examiner

PICKING SYSTEM

CROSS-REFERENCE TO RELATED APPLICATION

This application is the United States national phase of International Application No. PCT/JP2020/046070 filed Dec. 10, 2020, and claims priority to Japanese Patent Application No. 2019-229059 filed Dec. 19, 2019, the disclosures of which are hereby incorporated by reference in their entirety.

BACKGROUND OF THE INVENTION

Field of the Invention

The present invention relates to a picking system that collects a necessary article from among a plurality of articles stored and delivers the necessary article.

Description of Related Art

For example, at a distribution base of an online retail business, various articles may be stored in a distribution warehouse, and when an order is received, the purchased articles may be packed in boxes for each delivery destination and shipped from the distribution warehouse. In such a case, a picking system that collects a necessary article from among a plurality of articles stored and delivers the necessary article is used. An example of such a picking system is disclosed in JP 2004-189417A (Patent Document 1). Hereinafter, the reference numerals in parentheses in the description of the background art are those in Patent Document 1.

The picking system disclosed in Patent Document 1 includes a large number of carriages (122) that each have a sorting tray (121) that can be tilted in a direction orthogonal to a travel direction, as sorting devices. This picking system moves a carriage (122) to a target sorting position, thereafter tilts the sorting tray (121) thereof toward the collection box (B) to eject articles, and sorts the articles. The sorted articles are put into the collection box (B), are packed by an operator or the like, or are transported to the next place.

PATENT DOCUMENTS

Patent Document 1: JP 2004-189417A

In the picking system disclosed in Patent Document 1, collection boxes (B) into which sorted articles are to be put are respectively installed at a plurality of locations in the travel direction of the carriages (122). In this case, a work place at which the next work such as packing or transportation of the articles sorted in the collection boxes (B) is to be carried out is required for each of the installation places of the collection boxes (B), which leads to the decentralization of work places for the sorted articles.

In view of the above situation, there is a demand for realization of a picking system that is capable of centralizing work places for sorted articles.

SUMMARY OF THE INVENTION

A system according to the present disclosure is a picking system that collects a necessary article from among a plurality of articles stored and delivers the necessary article, the picking system including:
a multi-tier sorting device that has ports in a plurality of tiers at different levels in a top-bottom direction, and is configured to sort and discharge each of the articles into one of the ports in the plurality of tiers;
a plurality of first transport devices respectively corresponding to the ports in the plurality of tiers; and
a second transport device configured to receive the articles from the first transport devices and transport the articles,
wherein the plurality of first transport devices respectively have first transport surfaces, receive the articles discharged through the ports, with use of the first transport surfaces, and transport the articles placed on the first transport surfaces, in a separation direction away from the ports, and
the second transport device has a second transport surface configured to be movable upward and downward, and, in a state where the second transport surface is located at a height corresponding to a terminal end portion of the first transport surface of any one of the plurality of first transport devices, the second transport device receives the articles discharged from the terminal end portion of the first transport surface and transports the articles, with use of the second transport surface.

With this configuration, articles sorted by the multi-tier sorting device and discharged from a plurality of ports can be received and transported by first transport devices provided in correspondence with the plurality of ports. A plurality of articles transported by the plurality of first transport devices can be received and transported by the second transport device. As a result, the articles sorted by the multi-tier sorting device can be sequentially transported by the second transport device in units of article groups after the sorting. Therefore, with this configuration, it is possible to centralize work places for the next work to be performed on the sorted articles, to a smaller number of specific places compared to the number of ports, and accordingly it is possible to improve work efficiency.

Further features and advantages of the techniques according to the present disclosure will be further clarified by the following illustration of exemplary and non-limiting embodiments described with reference to the drawings.

DESCRIPTION OF THE INVENTION

Overall Configuration of Picking System

Figure 1:
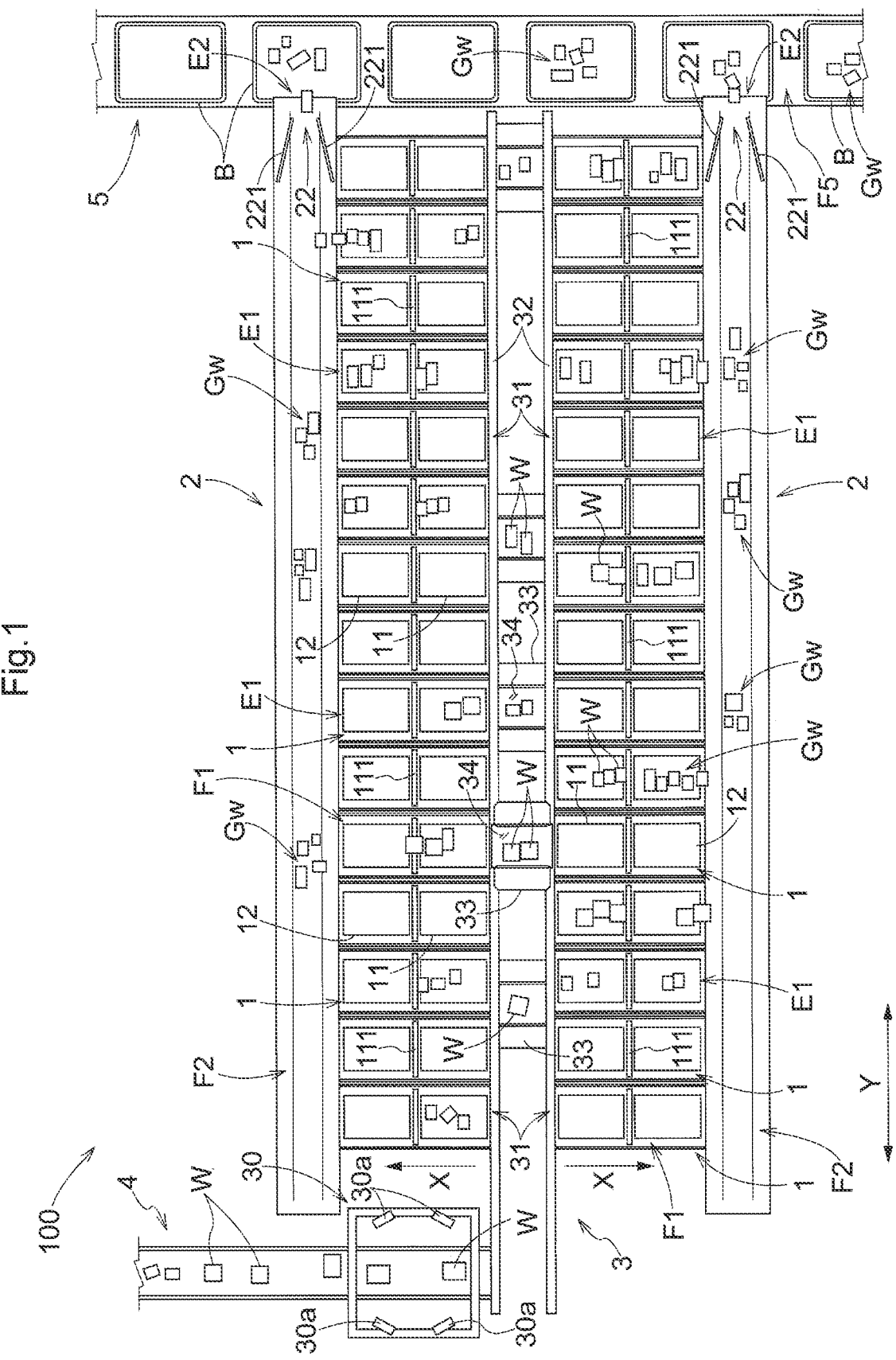
FIG. 1 is a schematic plan view of a picking system.

As shown in FIG. 1, a picking system 100 is provided in a distribution facility owned by an online retail business operator, for example, and collects a necessary article W from among a plurality of stored articles W and delivers the necessary article W. The picking system 100 collects a necessary article W from among a plurality of articles W stored in an automated warehouse (not shown) and delivers the necessary article W, for example. In this case, the automated warehouse stores a plurality of articles W that are in a state of being housed in containers type by type. The plurality of articles W stored in containers type by type are automatically taken out of the automated warehouse and separated into individual articles W by an article separation unit (not shown). Thereafter, each of the plurality of articles W are transported individually. Note that the articles W include, for example, various products such as groceries and household goods. However, articles W are not limited to such articles, and may be work-in-progress products used in a factory production line or the like.

The picking system 100 includes a multi-tier sorting device 3, first transport devices 1 that each receive articles W from the multi-tier sorting device 3 and transport the articles W in a direction away from the multi-tier sorting device 3, and second transport devices 2 that each receive articles W from a first transport device 1 and transports the articles W. In the present embodiment, the picking system 100 further includes a carry-in device 4 that carries articles W into the multi-tier sorting device 3, and a carry-out device 5 that receives articles W from a second transport device 2 and carries out the articles W.

In the present embodiment, the plurality of articles W stored in the above automatic warehouse in a state of being housed in containers type by type are separated from each other by the above article separation unit, are transported by the carry-in device 4, are handed over to the multi-tier sorting device 3, and are sorted. Then, the articles W sorted by the multi-tier sorting device 3 are transported by a first transport device 1, are thereafter handed over to a second transport device 2, and are transported by the second transport device 2. Furthermore, the articles W transported by the second transport device 2 are handed over to the carry-out device 5, and are transported by the carry-out device 5 to the outside.

Hereinafter, the configuration of each component of the picking system 100 will be described in detail. In the following description, a direction away from the multi-tier sorting device 3 (specifically, ports 31, which will be described later) is defined as a separation direction X, and a direction intersecting the separation direction X in a plan view is defined as a width direction Y. The separation direction X coincides with the direction in which the articles W are transported by the first transport devices 1. The width direction Y is a direction in which a plurality of rows of ports 31, which will be described later, are arranged. In the present embodiment, the width direction Y is defined as a direction orthogonal to the separation direction X in a plan view. That is to say, in the present embodiment, the separation direction X and the width direction Y extend in a horizontal direction, and are orthogonal to each other in a plan view. Also, in the present embodiment, the direction in which articles W are transported by the second transport devices 2 is defined as a direction parallel to the width direction Y.

Carry-In Device

The carry-in device 4 is a device for carrying articles W into the multi-tier sorting device 3. In the present embodiment, the carry-in device 4 sequentially carries the articles W, which have been carried out of the above automated warehouse in a state of being housed in containers type by type and have been separated from each other by the article separation unit, into the multi-tier sorting device 3. In the example shown in the drawings, the carry-in device 4 is configured as a conveyor. However, the carry-in device 4 is not limited to having such a configuration, and may be configured as any type of transport device, such as a transport cart or an overhead transport vehicle, for example.

Multi-Tier Sorting Device

Figure 2:
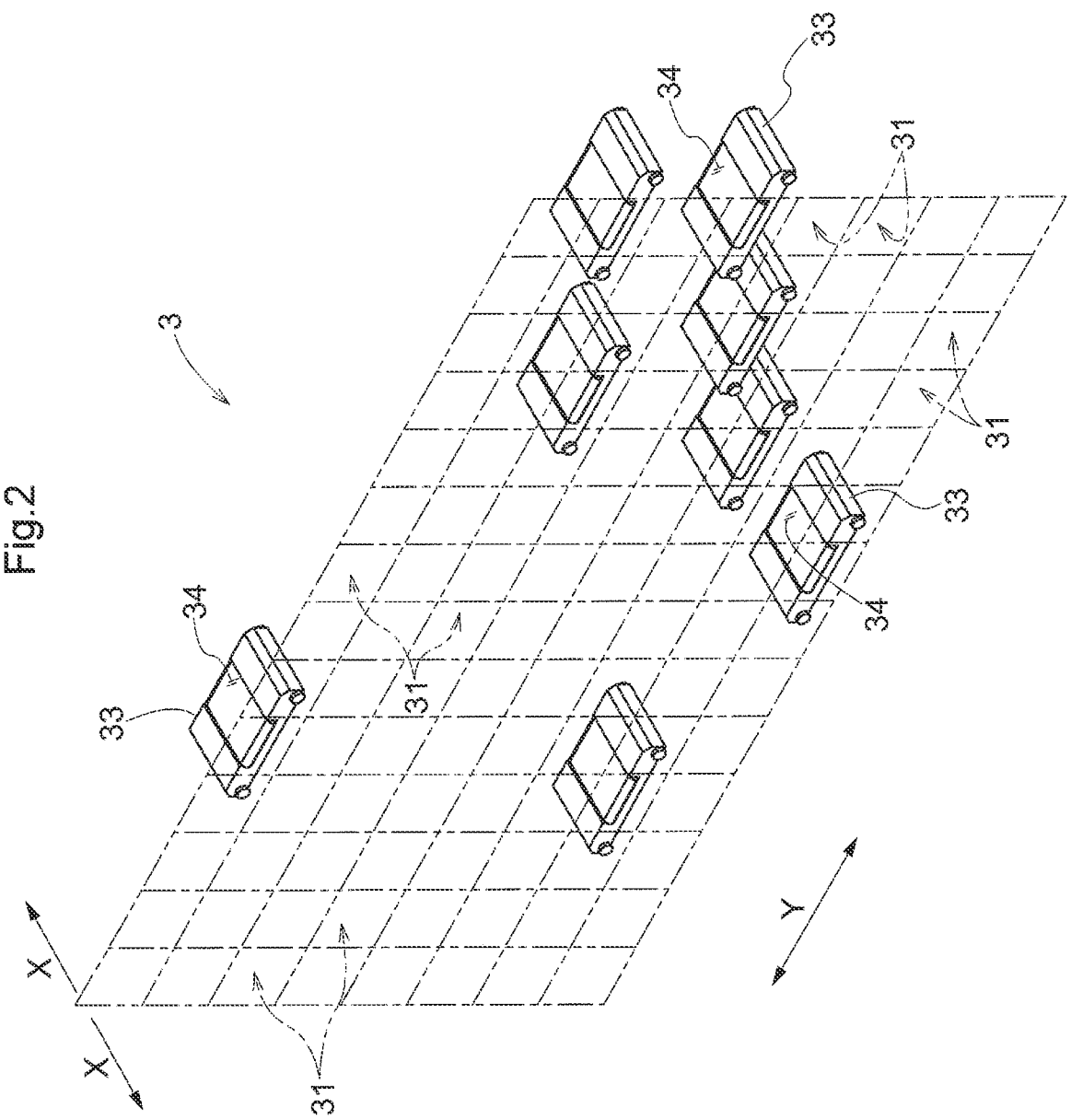
FIG. 2 is a perspective view showing a portion of a multi-tier sorting device.

The multi-tier sorting device 3 is a device for sorting articles W carried from the carry-in device 4. As shown in FIG. 2, the multi-tier sorting device 3 has ports 31 in a plurality of tiers at different levels in a top-bottom direction, and sorts and discharges each of the articles W to one of the ports 31 in the plurality of tiers. In the example shown in the figure, the multi-tier sorting device 3 has eight tiers of ports 31. Furthermore, in the present embodiment, the multi-tier sorting device 3 has ports 31 in a plurality of rows at different positions in the width direction Y. That is to say, in this example, the multi-tier sorting device 3 has a plurality of ports 31 that are arranged in an orthogonal grid consisting of a plurality of tiers and plurality of rows. Here, for example, if the multi-tier sorting device 3 is provided with a housing that surrounds the outer periphery thereof, the ports 31 may be a plurality of openings formed in the housing. If the multi-tier sorting device 3 is not provided with such a specific housing, the ports 31 may be virtually set in correspondence with connection points between the multi-tier sorting device 3 and the first transport devices 1.

In the present embodiment, the multi-tier sorting device 3 sorts the articles W into the plurality of ports 31 based on order information. In this example, the multi-tier sorting device 3 sorts the articles W by discharging each article W from a specific port 31 determined based on order information and delivering the articles W to a first transport device 1. Note that the order information here is, for example, information indicating an order (a picking order) that specifies the type(s) and quantity of the articles W to be shipped (which may be of a single type or a combination of a plurality of types). The multi-tier sorting device 3 discharges one or more articles W specified by each order, to a different port 31 for each order, thereby sorting the articles W.

As shown in FIG. 1, in the present embodiment, the multi-tier sorting device 3 includes an article discrimination unit 30 for discriminating each article W. The multi-tier sorting device 3 sorts articles W based on the result of the discrimination by the article discrimination unit 30. In this example, the article discrimination unit 30 is provided with cameras 30a that each capture images of articles W, and is configured to discriminate the articles W by performing image recognition processing on image data acquired by the cameras 30a. In the example shown in the figure, a plurality of cameras 30a are located so as to be able to capture images of articles W carried in by the carry-in device 4, in a plurality of directions. As a result, even if the orientations of articles W are different for each article W when carried in, it is possible to appropriately discriminate each article W. Note that the present invention is not limited to the above configuration, and, for example, an IC tag, a barcode, or the like (a storage unit) for storing article information may be attached to each article W, and the article discrimination unit 30 may be provided with a reader (a reading unit) for reading article information, and configured to discriminate each article W based on the article information read by this reader.

Figure 3:
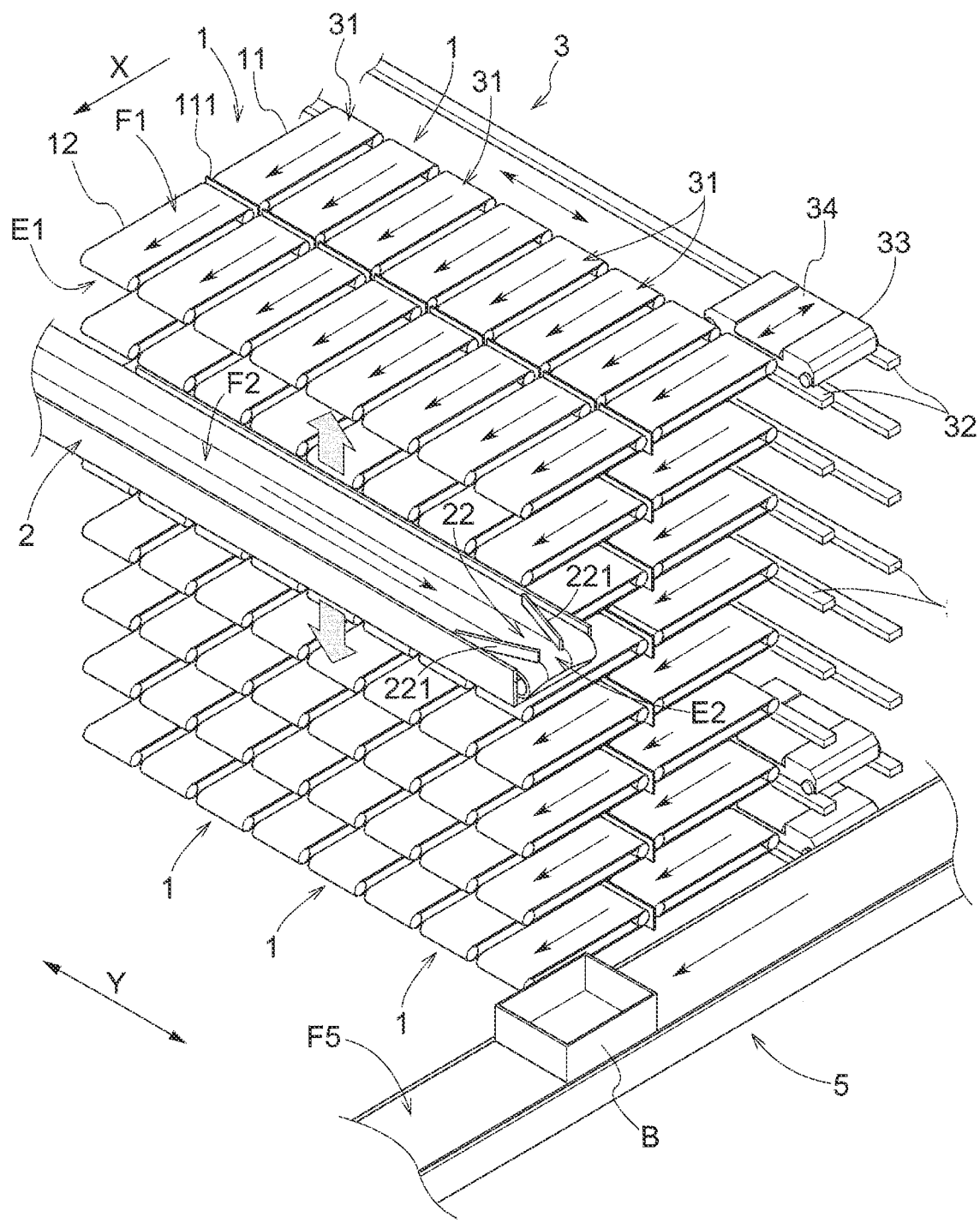
FIG. 3 is a perspective view showing a portion of the picking system.

In the present embodiment, as shown in FIGS. 1 and 3, the multi-tier sorting device 3 includes rails 32 and a plurality of transport carts 33 that move along the rails 32. The rails 32 have horizontal portions provided in the horizontal direction (in this example, the width direction Y) for each of the plurality of tiers in which ports 31 are provided. In this example, each of the transport carts 33 is configured to travel along the horizontal portions of the rails 32, thereby transporting articles W in the width direction Y. Also, the rails 32 may extend in the vertical direction and include vertical portions that connect horizontal portions arranged in the plurality of tiers. In this case, each of the transport carts 33 is configured to move up and down along the vertical portions of the rails 32, so that each of the transport carts 33 can move to each of the horizontal portions arranged in the plurality of tiers. If this is the case, the number of transport carts 33 is not limited to the number of tiers in which the ports 31 are provided. Therefore, for example, the number of transport carts 33 may be smaller or larger than the number of tiers in which the ports 31 are provided. For example, five transport carts 33 may be arranged for eight tiers, or twelve transport carts 33 may be arranged for eight tiers. Note that, in the example shown in FIG. 2, eight transport carts 33 are arranged for eight tiers.

In the present embodiment, each of the transport carts 33 is provided with a discharge conveyor 34 that supports articles W from below and discharges the articles W from the port 31. The discharge conveyor 34 moves articles W in a left-right direction (the separation direction X in this example) with respect to the travel direction of the transport carts 33 (the width direction Y in this example). In the example shown in FIG. 1, the ports 31 are arranged on both the left and right sides of the travel paths of the transport carts 33 with respect to the travel direction of the transport carts 33. The discharge conveyor 34 can discharge articles W to each of the ports 31 arranged on both the left and right sides.

First Transport Devices

The first transport devices 1 are devices for transporting article W sorted by the multi-tier sorting device 3. The first transport devices 1 are respectively provided in correspondence with the ports 31 in the plurality of tiers. In the present embodiment, the plurality of first transport devices 1 are arranged in the width direction Y so as to correspond to the plurality of rows of ports 31 in the plurality of tiers. In the example shown in FIG. 1, a plurality of first transport devices 1 are provided in areas on each of the left and right sides of the travel paths of the transport carts 33 with respect to the travel direction of the transport carts 33.

As shown in FIG. 3, each of the plurality of first transport devices 1 has a first transport surface F1. Each of the first transport devices 1 receives articles W discharged from a port 31 via the first transport surface F1, and transports the articles W placed on the first transport surface F1, in the separation direction X away from the port 31.

Figure 4:
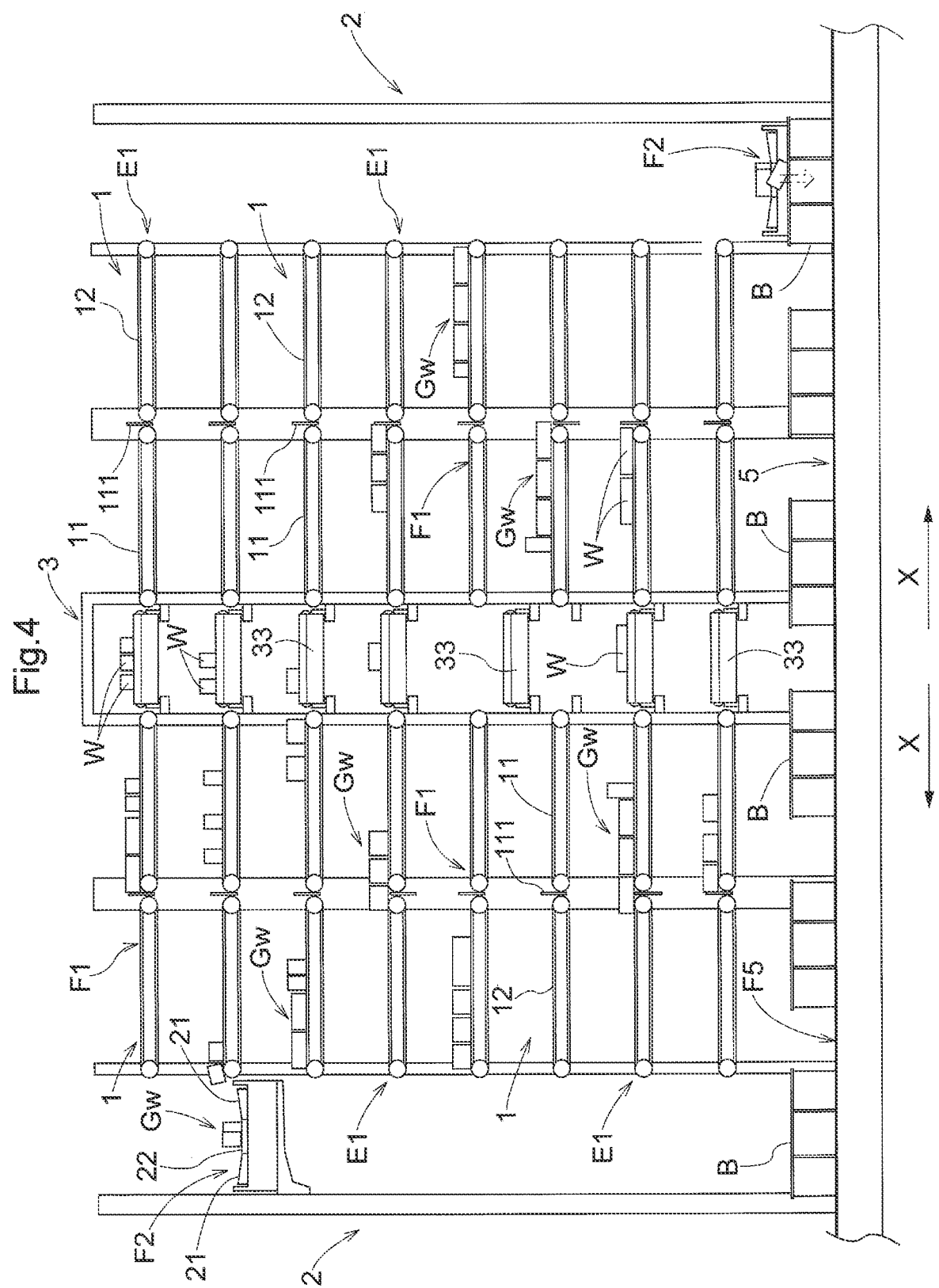
FIG. 4 is a width-direction view of the picking system.

As shown in FIGS. 1 and 4, in the present embodiment, each first transport device 1 transports articles W to a second transport device 2 in units of an article group Gw, which is a group of a plurality of articles W corresponding to one order. The number of articles W included in one article group Gw differs for each order. For example, depending on the order, one article W may constitute one article group Gw.

In the present embodiment, each first transport device 1 includes an upstream transport unit 11 and a downstream transport unit 12. The upstream transport unit 11 and the downstream transport unit 12 are arranged in the separation direction X, and are each configured to transport articles W in the separation direction X. The upstream transport unit 11 and the downstream transport unit 12 are configured as conveyers that operate independent of each other.

The upstream transport unit 11 functions as an article storage unit that stores articles W to be discharged to the second transport device 2. The upstream transport unit 11 sequentially receives and stores articles W from the multi-tier sorting device 3 until, for each order, an article group Gw, which is a set of all the articles W specified by the order, is collected. Note that the fact that an article group Gw is collected means that all the articles W constituting the article group Gw are collected. When the article group Gw for each order is collected, the upstream transport unit 11 transports the article group Gw to the downstream transport unit 12. In the present embodiment, the upstream transport unit 11 includes a stopper 111 provided at the downstream end in the transport direction thereof. The stopper 111 is configured to change the state thereof between a closed state in which a transport path from the upstream transport unit 11 to the downstream transport unit 12 is closed and an open state in which the transport path is opened. The upstream transport unit 11 transports articles W in the separation direction X while keeping the stopper 111 closed. As a result, the upstream transport unit 11 stores the articles W at the downstream end while preventing the articles W from moving. Thereafter, when the article group Gw for the order is collected, the upstream transport unit 11 brings the stopper 111 into an open state and transports the article group Gw to the downstream transport unit 12.

Figure 5:
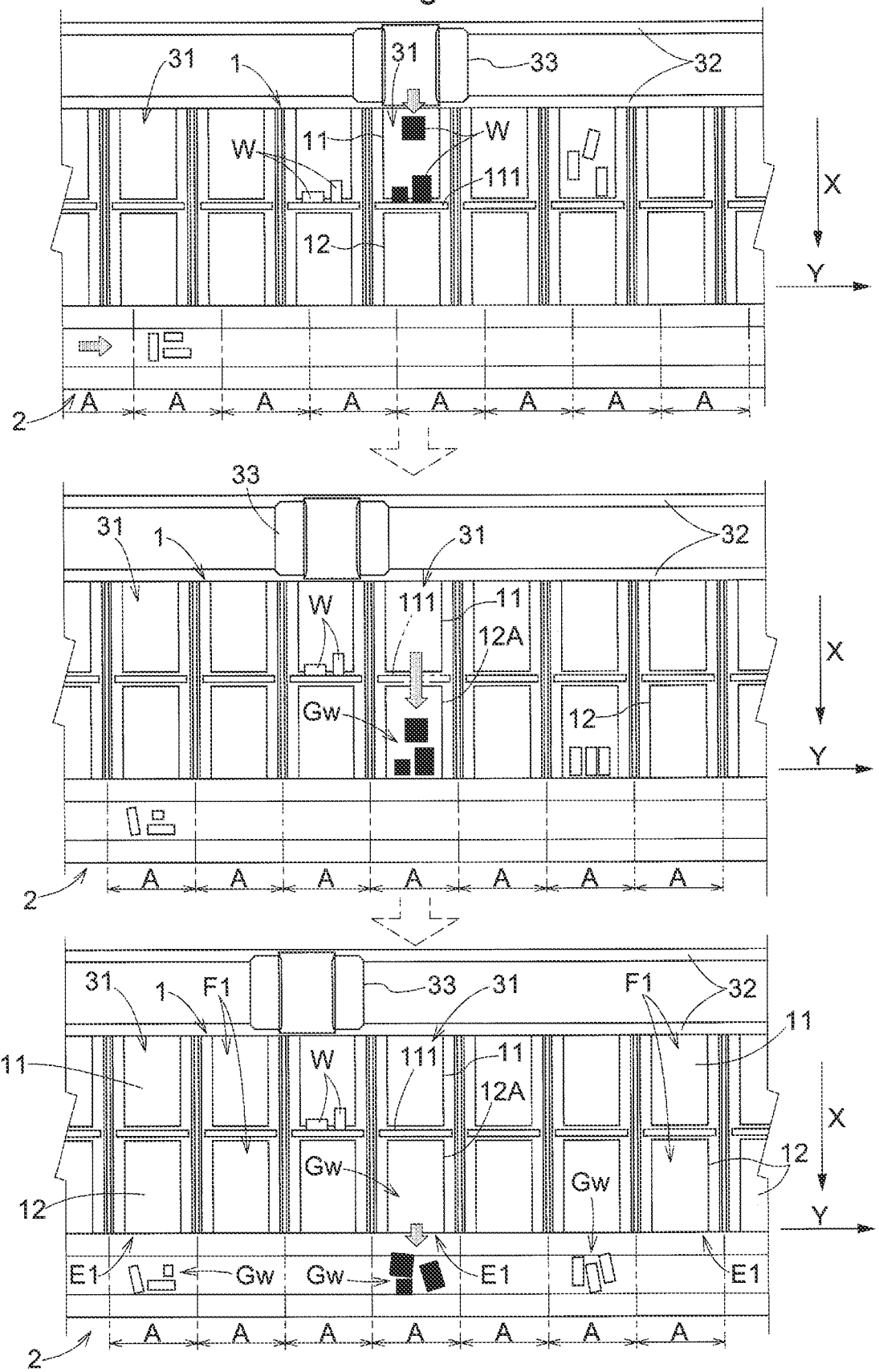
FIG. 5 is a plan view showing some of the operations of the picking system.

The downstream transport unit 12 functions as an article discharge unit for discharging articles W to a second transport device 2. The downstream transport unit 12 discharges articles W to a second transport device 2 in units of article groups Gw transported from the upstream transport unit 11. In the present embodiment, the downstream transport unit 12 discharges articles W to a second transport device 2 in a state where a second transport surface F2 of the second transport device 2 is located at a height corresponding to a terminal end portion E1 of the first transport surface F1. Also, in this example, as shown in FIG. 5, the downstream transport unit 12 is configured to discharge articles W in any of the areas A on which no article W have been placed yet, of the plurality of areas A virtually set on the second transport surface F2 of the second transport device 2 (see the bottom part of FIG. 5). As a result, the second transport device 2 can transport article groups Gw related to a plurality of orders, in parallel.

Second Transport Devices

Each second transport device 2 is a device for transporting articles W received from a first transport device 1. In the example shown in FIG. 1, the second transport devices 2 are arranged on both the left and right sides of the travel path of the transport carts 33 with respect to the travel direction of the transport carts 33. A plurality of first transport devices 1 are arranged in the width direction Y between the second transport devices 2 and the transport paths of the transport carts 33 in the separation direction X.

As shown in FIG. 3, each second transport device 2 has a second transport surface F2 configured to be movable upward and downward. In a state where the second transport surface F2 thereof is located at the height corresponding to the terminal end portion E1 of the first transport surface F1 of any of the plurality of first transport devices 1, the second transport device 2 receives articles W discharged from the terminal end portion E1 of the first transport surface F1 via the second transport surface F2, and transports the articles W. In the present embodiment, each second transport device 2 transports articles W placed on the second transport surface F2, in the width direction Y. In this example, each second transport device 2 transports articles W in units of article groups Gw for each order.

In the present embodiment, in each of the plurality of tiers, the second transport surface F2 of each second transport device 2 is provided in the width direction Y so as to extend along the terminal end portions E1 of the plurality of first transport surfaces F1 arranged in the width direction Y. In this example, in each of the plurality of tiers, the second transport surface F2 of each second transport device 2 is provided so as to extend through the entire region in which the terminal end portions E1 of the plurality of first transport surfaces F1 are arranged in the width direction Y. Therefore, in each of the plurality of tiers, a second transport device 2 can receive articles W from all of the plurality of first transport devices 1 arranged in the width direction Y. Each second transport device 2 can receive articles W from the first transport devices 1 in all of the rows in all of the plurality of tiers by moving the second transport surface F2 thereof up and down, and transport the received articles W in the width direction Y.

As shown in FIG. 5, in the present embodiment, a plurality of areas A are virtually set on the second transport surface F2 of each second transport device 2. The setting of these areas A and the control of the first transfer devices 1 and the second transfer devices 2 based on the areas A are performed by an overall control device Ct, a first transport control unit C1, and a second transport control unit C2, which will be described later. The size of each area A is set so that one or a plurality of articles W that constitute an article group Gw can be placed thereon. In the example in the figure, the length of each area A in the width direction Y is set to be equal to the size of the first transport device 1 in the width direction Y. Each second transport device 2 intermittently moves the second transport surface F2 (the areas A) thereof by the length of each area A in the width direction Y, or continuously moves the second transport surface F2 without stopping. The downstream transport unit 12 of each first transport device 1 discharges an article group Gw to an area A on which no article group Gw has been placed yet, of the plurality of areas A set on the second transport surface F2 thereof. At this time, in order to reduce the risk of a plurality of article group Gw related to different orders being mixed with each other on the second transport surface F2, it is preferable that the downstream transport unit 12 is controlled so as not to discharge an article group Gw to areas A that are adjacent to the areas A on which an article group Gw has already been placed. For example, control may be performed so that an article group Gw is not to be discharged only to areas A adjacent to the areas A on which an article group Gw is placed. That is to say, an article group Gw may be discharged to every other area A. Alternatively, control may be performed so that an article group Gw is not to be discharged to not only areas A that are adjacent to the areas A on which an article group Gw is placed, but also areas A that are adjacent to the adjacent areas A. That is to say, an article group Gw may be discharged to every three areas A. FIG. 5 shows an example in which the case in which an article group Gw is discharged every other area A and the case in which an article group Gw is discharged every three areas A are mixed. Note that it is possible to perform either control to discharge an article group Gw to every other area A or control to discharge an article group Gw to every three areas A. It is also possible to perform control to discharge an article group Gw to every four or more areas A.

As shown in FIG. 4, in the present embodiment, one second transport device 2 is provided on each of the left and right sides of the travel path of the transport carts 33 with respect to the travel direction of the transport carts 33. Each second transport device 2 has a second transport surface F2 configured to be movable upward and downward as described above, and therefore, even if the number of second transport devices 2 is smaller than the number of tiers provided with the first transport devices 1, each second transport device 2 can receive articles W from a first transport device 1 in each of the plurality of tiers. However, the present invention is not limited to such a configuration, and second transport devices 2 may respectively be provided in a plurality of tiers in which the first transport devices 1 are provided. For example, one second transport device 2 may be provided in each tier, and accordingly, in total, the same number of second transport devices 2 as the tiers in which the first transport devices 1 are provided may be provided.

In the present embodiment, each second transport device 2 is configured as a trough conveyor in which a central portion 20 of the second transport surface F2 thereof in a cross section orthogonal to the direction in which articles W are transported by the second transport device 2 is recessed with respect to two side portions 21 of the second transport surface F2 (see FIG. 4). With this configuration, while articles W are being transported by a second transport device 2, the articles W can be brought closer to the central portion 20 of the second transport surface F2. Therefore, it is possible to prevent articles W that are transported, from jutting out of the second transport surface F2 in the left and right directions relative to the transport direction. Also, as described above, in the present embodiment, each second transport device 2 transports articles W in units of article groups Gw that are each based on an order. Therefore, when an article group Gw is constituted by a plurality of articles W, the plurality of articles W constituting the article group Gw can be transported in the state of being gathered together in the central portion 20 of the second transport surface F2.

As shown in FIG. 1, in the present embodiment, each second transport device 2 transports an article group Gw received from a first transport device 1, in the width direction Y, and discharges the article group Gw to the carry-out device 5. In this example, containers B for receiving and housing articles W discharged from the second transport devices 2 are arranged below end portions E2 of the second transport surfaces F2 in the width direction Y. In the example shown in the figure, a plurality of containers B are sequentially transported in a state of being placed on a transport surface F5 of the carry-out device 5. For example, as shown in FIG. 4, each second transport device 2 move the second transport surface F2 thereof up and down so as to adjust the height of the second transport surface F2 to the height of the transport surface F5 of the carry-out device 5, more specifically the height of containers B placed on the transport surface F5, and puts the article group Gw into the container B placed on the transport surface F5. At this time, it is preferable that the carry-out device 5 stops the transport of the container B into which the article group Gw is to be put, or controls the transport speed to be lower. As a result, it is possible to appropriately put an article group Gw into a container B.

As shown in FIGS. 1 and 3, in the present embodiment, each second transport device 2 is provided with a narrowing portion 22 that narrows the range in which an article group Gw is arranged on the second transport surface F2, in a direction (the separation direction X in this example) that is orthogonal to the transport direction, at a position that is adjacent to the downstream end portion E2 of the second transport surface F2 in the transport direction.

The narrowing portion 22 includes a pair of guide members 221 located apart from each other in a direction (the separation direction X) orthogonal to the transport direction of the second transport device 2. The pair of guide members 221 is fixed to the second transport surface F2 so as to be immovable. With this configuration, articles W transported on the second transport surface F2 come into contact with the pair of guide members 221 from upstream in the transport direction. The pair of guide members 221 are arranged so as to narrow the distance therebetween in the separation direction X toward the downstream side in the transport direction of the second transport device 2. As a result, the pair of guide members 221 can cause articles W to flow to the downstream side while being in contact with the articles W that constitute the article group Gw. The pair of guide members 221 narrow the range in which an article group Gw constituted by a plurality of articles W transported on the second transport surface F2 is arranged, so as to be closer to the center in the direction orthogonal to the transport direction. With the narrowing portion 22 provided with such a pair of guide members 221, for example, a plurality of articles W constituting an article group Gw can be lined up in the transport direction of the second transport device 2 after passing through the narrowing portion 22. With such a configuration, it is possible to put a plurality of articles W constituting an article group Gw into a container B one by one.

Carry-Out Device

The carry-out device 5 is a device for carrying out articles W to the outside. In the present embodiment, the carry-out device 5 has a transport surface F5, and the transport surface F5 supports a plurality of containers B from below and sequentially transports the plurality of containers B. In the example shown in the drawings, the carry-out device 5 is configured as a conveyor. However, the carry-out device 5 is not limited to having such a configuration, and may be configured as any type of transport device such as a transport cart.

Components for Controlling Picking System

Figure 6:
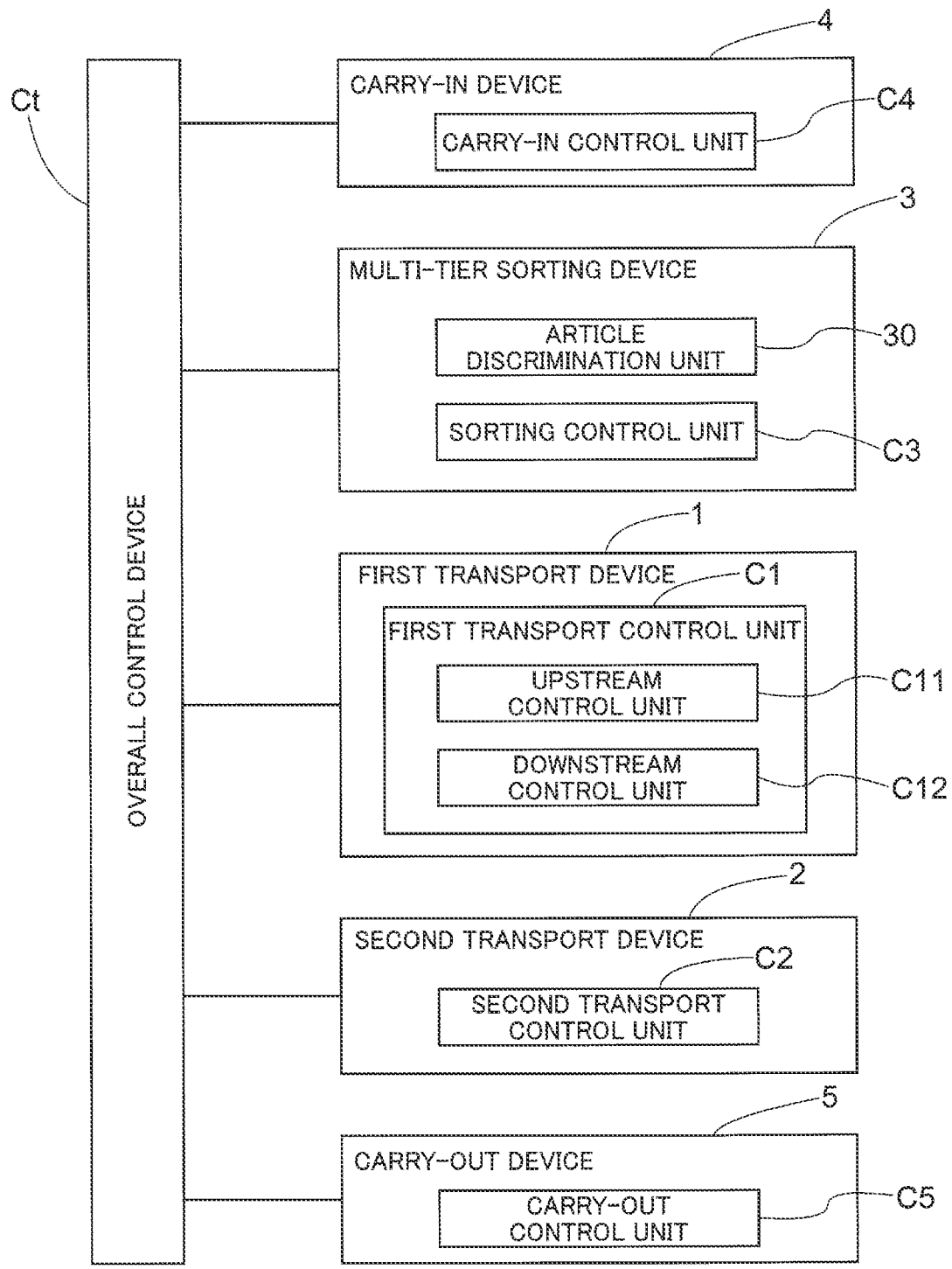
FIG. 6 is a control block diagram for the picking system.

Next, components for controlling the picking system 100 will be described. FIG. 6 is a block diagram showing components for controlling the picking system 100.

As shown in FIG. 6, the picking system 100 includes the overall control device Ct that performs overall control regarding storage and transportation of articles W in the system. The overall control device Ct is configured to be able to mutually communicate with a carry-in control unit C4 that controls the operation of the carry-in device 4, a sorting control unit C3 that controls the operation of the multi-tier sorting device 3, the first transport control unit C1 that controls operation of the first transport device 1, the second transport control unit C2 that controls the operation of the second transport device 2, and a carry-out control unit C5 that controls the operation of the carry-out device 5, by wire or wireless. The overall control device Ct, the carry-in control unit C4, the first transport control unit C1, the second transport control unit C2, and the carry-out control unit C5 each include, for example, a processor such as a microcomputer, peripheral circuits such as a memory, and so on. Each function is realized through cooperation between these pieces of hardware and a program executed on a processor of a computer or the like.

In the present embodiment, the sorting control unit C3 is configured to be able to acquire the results of the discrimination by the article discrimination unit 30, and controls the operation of the multi-tier sorting device 3 so as to sort articles W based on the results of the discrimination.

In addition, in the present embodiment, the first transport control unit C1 includes an upstream control unit C11 that controls the operation of the upstream transport unit 11 and a downstream control unit C12 that controls the operation of the downstream transport unit 12 (see also FIG. 4). In this example, the upstream control unit C11 controls the drive and stop of the conveyor unit of the upstream transport unit 11, and also controls the open/closed state of the stopper 111. Also, the downstream control unit C12 controls the drive and stop of the conveyor unit of the downstream transport unit 12.

Figure 7:
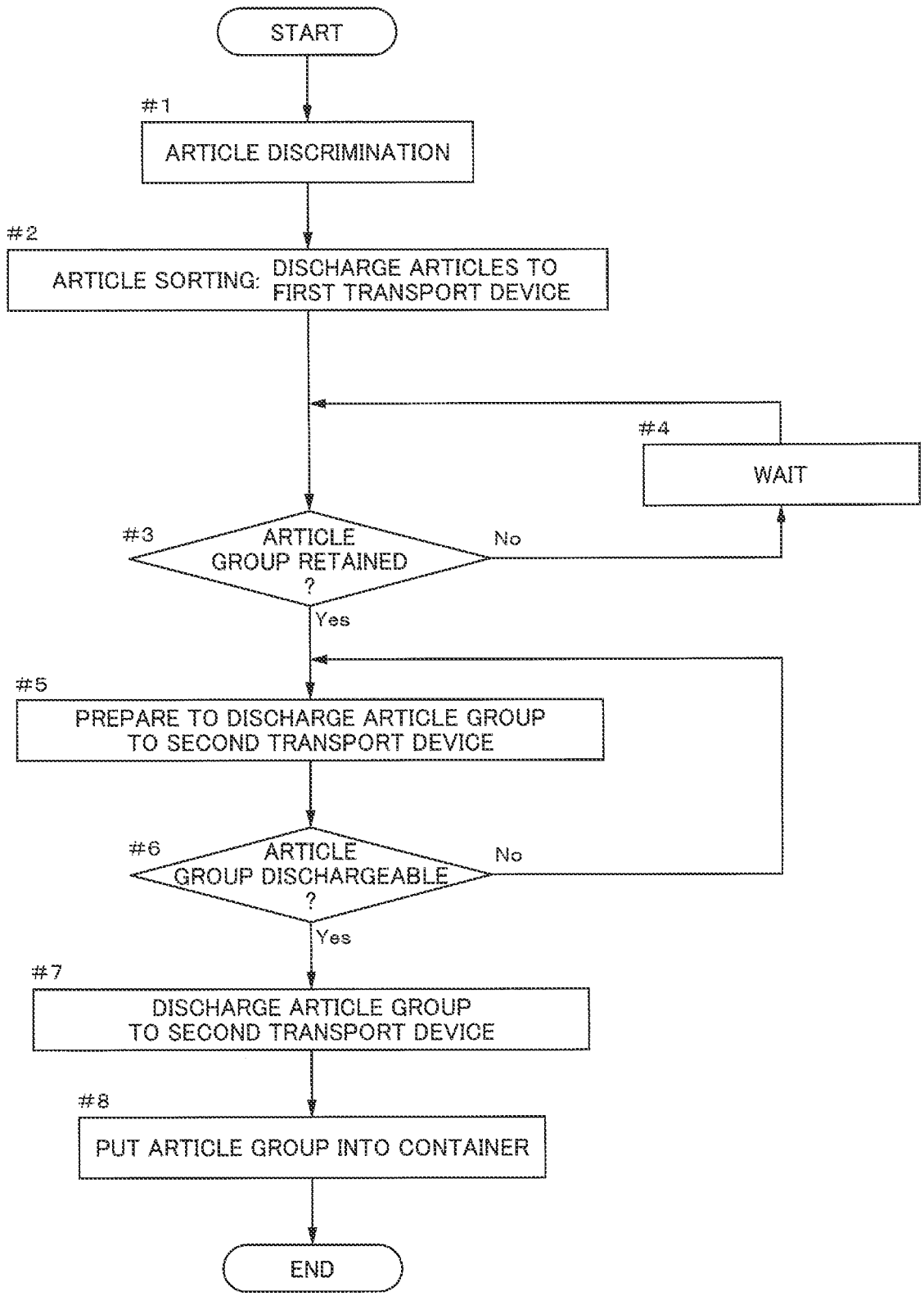
FIG. 7 is a flowchart showing control procedures carried out by the picking system.

Next, procedures for controlling the picking system 100 will be described, mainly with reference to FIG. 7. FIG. 7 is a flowchart showing some of the procedures for controlling the picking system 100.

In the picking system 100, first, articles W are discriminated (step #1). In the present embodiment, the article discrimination unit 30 discriminates articles W carried in by the carry-in device 4. As described above, in this example, the type or the like of each article W is discriminated through image recognition with the use of the camera 30a (see FIG. 1).

Next, articles W are sorted based on the results of the discrimination by the article discrimination unit 30 (step #2). As shown in the top part of FIG. 5, the multi-tier sorting device 3 sorts the articles W by discharging the articles W through one of the plurality of ports 31 to the first transport device 1 corresponding to the port 31. In this example, the sort processing performed on the articles W includes the selection of a specific port 31 to be the sorting destination from among a plurality of ports 31 based on order information and the results of discrimination of the articles W by the article discrimination unit 30.

Next, whether or not the article group Gw indicated by order information is stored in the upstream transport unit 11 in the first transport device 1 (specifically, whether or not all the articles W constituting the article group Gw are stored) is determined (step #3). If the article group Gw has not been stored yet (step #3; No), the system waits until the article group Gw is stored (step #4). If it is determined that the article group Gw indicated by order information is stored in the upstream transport unit 11 (step #3; Yes), the system prepares for discharging the article group Gw to the second transport device 2 (step #5). Specifically, as shown in the central part of FIG. 5, the stopper 111 that is in the closed state to close the transport path from the upstream transport unit 11 to the downstream transport unit 12 is brought into an open state to open the transport path, and the article group Gw is transported from the upstream transport unit 11 to the downstream transport unit 12. If the downstream transport unit 12 is not in the state of being able to discharge the article group Gw to a second transport device 2 (step #6; No), the downstream transport unit 12 stops driving and waits while preparing for discharge (step #5).

Next, when the downstream transport unit 12 is in the state of being able to discharge the article group Gw to a second transport device 2 (step #6; Yes), the article group Gw is discharged from the downstream transport unit 12 to the second transport device 2 (step #7). Here, the state of being able to discharge the article group Gw to a second transport device 2 is a state in which the second transport surface F2 of the second transport device 2 is located at the height corresponding to a target downstream transport unit 12A, which is the downstream transport unit 12 (the terminal end portion E1 of the first transport surface F1) from which the article group Gw is to be discharged, and an area A of the second transport surface F2 on which the article group Gw can be placed is located at a position corresponding to the target downstream transport unit 12A. More specifically, the state in which the second transport surface F2 of the second transport device 2 is located at the height corresponding to the target downstream transport unit 12A, as shown in FIG. 4, is a state in which the second transport surface F2 of the second transport device 2 is located at a height that is lower than the first transport surface F1 of the target downstream transport unit 12A by a predetermined height. The difference between the second transport surface F2 and the first transport surface F1 at this time is set to be, for example, smaller than the height of the articles W. The state in which an area A of the second transport surface F2 on which the article group Gw can be placed is located at a position corresponding to the target downstream transport unit 12A is a state in which the area A on which the article group Gw has not been placed yet is located at a position adjacent to the terminal end portion E1 of the first transport surface F1 of the target downstream transport unit 12A.

Next, the article group Gw is transported by the second transport device 2 in the width direction Y, and the article group Gw is put into a container B placed on the transport surface F5 of the carry-out device 5 (step #7). Specifically, the second transport device 2 moves the second transport surface F2 thereof up and down so as to adjust the height of the second transport surface F2 to the height of the transport surface F5 of the carry-out device 5, and puts the article group Gw into the container B placed on the transport surface F5. Thereafter, the article group Gw put into the container B is transported by the carry-out device 5 to the outside.

Other Embodiments

Next, other embodiments of the picking system will be described.

(1) The above embodiment describes an example in which the second transport surface F2 of each second transport device 2 is provided so as to extend through the entire region in which the terminal end portions E1 of the plurality of first transport surfaces F1 are arranged in the width direction Y. However, the present invention is not limited to such an example, and the second transport surfaces F2 of the second transport devices 2 may be provided so as to extend along part of the region in which the terminal end portions E1 of the plurality of first transport surfaces F1 are arranged. In such a case, for example, it is possible to employ a configuration in which, when a plurality of second transport devices 2 are arranged in the width direction Y side by side and the second transport surfaces F2 of the plurality of second transport devices 2 are put together, the second transport surfaces F2 of the second transport devices 2 are provided so as to extend along the entire region in which the terminal end portions E1 of the plurality of first transport surfaces F1 mentioned above are arranged, as a whole.

(2) The above embodiment describes an example in which containers B that receive and house articles W discharged from the second transport device 2 are provided on the transport surface F5 of the carry-out device 5. However, the present invention is not limited to such an example, and it is possible that containers B are not placed on the transport surface F5 of the carry-out device 5. In such a case, for example, it is possible to employ a configuration in which the carry-out device 5 is configured to directly support articles W from below, using the transport surface F5, and transport the articles W.

(3) The above embodiment describes an example in which each second transport device 2 is configured as a trough conveyor in which the central portion 20 of the second transport surface F2 thereof is recessed with respect to two side portions 21 of the second transport surface F2. However, the present invention is not limited to such an example, and each second transport device 2 may be configured as a conveyor that has a flat second transport surface F2. Alternatively, each second transport device 2 is not limited to the belt type conveyor shown in the drawings, and may be a roller type conveyor or the like.

(4) The above embodiment describes an example in which each upstream transport unit 11 is provided with a stopper 111, and articles W are restricted by the stopper 111 from moving, so that articles W can be retained until the article group Gw specified by an order is collected (specifically, until all the articles W constituting the article group Gw are collected). However, the present invention is not limited to such an example, and it is possible that the upstream transport unit 11 is not provided with a stopper 111. If this is the case, the upstream transport unit 11 may be configured to retain articles W until the article group Gw specified by an order is collected, by controlling driving and stopping.

(5) The above embodiment describes an example in which a first transport device 1 discharges articles W to a second transport device 2 in units of article groups Gw for each order. However, the present invention is not limited to such an example. For example, each first transport device 1 may be configured to transport an article W sorted by the multi-tier sorting device 3 and discharged from a port 31, each time an article W is discharged in a separated form, without change. If this is the case, it is preferable that each second transport device 2 or the carry-out device 5 is provided with a mechanism for gathering an article group Gw for each order, or control is performed to gather an article group Gw for each order.

(6) The above embodiment describes an example of a configuration in which one first transport device 1 gathers an article group Gw for each order, and discharges the article group Gw to the second transport device 2. However, the present invention is not limited to such a configuration. It is possible to employ a configuration in which a plurality of first transport devices 1 each collect some articles of an article group Gw related to one order, and discharge them to a second transport device 2. For example, in the case where one order specifies one article group Gw that is constituted by ten articles W, each of the plurality of first transport devices 1 may collect some of the ten articles W (for example, two first transport devices 1 that are continuous in the width direction Y collect five articles W for each) and discharges them to a second transport device 2. In this case, the second transport device 2 or the carry-out device 5 may gather a plurality of articles W that constitute an article group Gw related to one order. For example, it is preferable that the timing of discharge from the plurality of first transport devices 1 is controlled so that sets of articles W included in the article group Gw discharged from the plurality of first transport devices 1 are continuously transported by the second transport device 2. In the above example, it is preferable that, for example, a total of ten articles W, which is a combination of five articles W discharged from one of the two first transport devices 1 and five articles W discharged from the other, are discharged to areas A that are adjacent to each other on the second transport surface F2.

(7) The above embodiment describes an example in which the second transport surface F2 of each second transport device 2 is arranged in the width direction Y so as to extend along the terminal end portions E1 of the plurality of first transport surface F1. However, the present invention is not limited to such a configuration, and the second transport surface F2 may be arranged in a direction orthogonal to the width direction Y. For example, the second transport surface F2 may be arranged in the separation direction X. In such cases, an upstream end portion of the second transport surface F2 in the transport direction may be configured to be connected to the terminal end portion E1 of a first transport surface F1. Each second transport device 2 may be configured to be able to move in the width direction Y in addition to the top-bottom direction, and in a state where an upstream end portion of the second transport surface F2 in the transport direction is located at a position corresponding to the terminal end portion E1 of the first transport surface F1 of any one of the plurality of first transport devices 1, the second transport surface F2 may receive articles W discharged from the first transport surface F1 and transport the articles W. Alternatively, the same number of second transport devices 2 as the first transport devices 1 arranged in the width direction Y in each tier may be provided side by side in the width direction Y.

Figure 8:
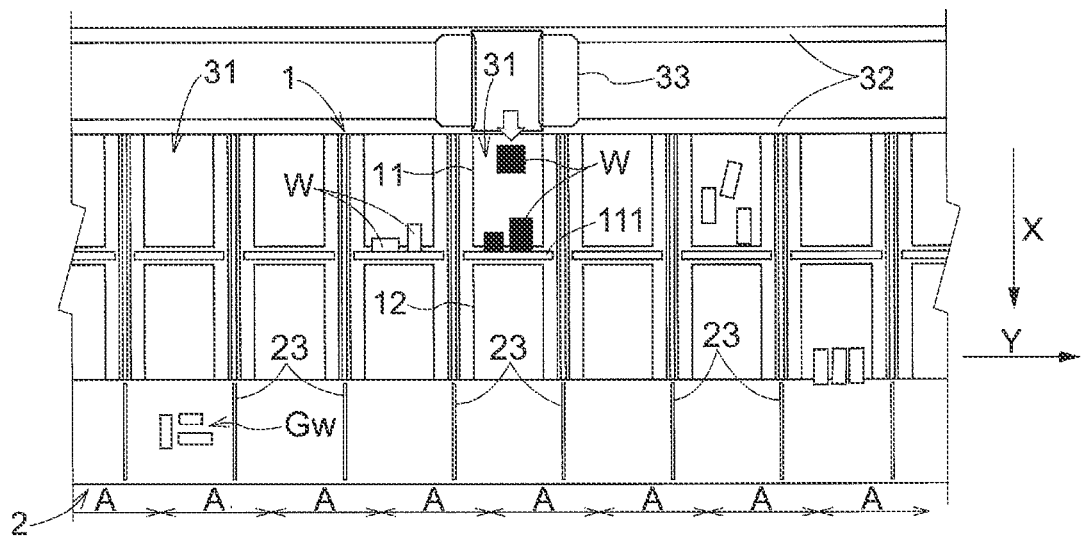
FIG. 8 is a plan view showing a picking system according to another embodiment.

(8) The above embodiment describes an example in which a plurality of virtual areas A used by the downstream transport unit 12 (the first transport device 1) to discharge articles W to a second transport device 2 are set on the second transport surface F2. In the example shown in FIG. 3, a member for partitioning between adjacent areas A or the like is not provided, and each area A is set as a virtual section. However, the present invention is not limited to such an example. For example, as shown in FIG. 8, horizontal rails 23 may be provided at regular intervals in the transport direction (width direction Y) on the second transport surface F2 so that areas A adjacent to each other are partitioned by the horizontal rails 23. If this is the case, the horizontal rails 23 may be provided so as to protrude upward from the second transport surface F2 and extend in a direction orthogonal to the transport direction of the second transport device 2 in a plan view. With such a configuration, it is possible to prevent articles W placed on the second transport surface F2 from, for example, rolling to move out of the specified area A, and reduce the risk of a plurality of article groups Gw related to different orders being mixed on the second transport surface F2.

Figure 9:
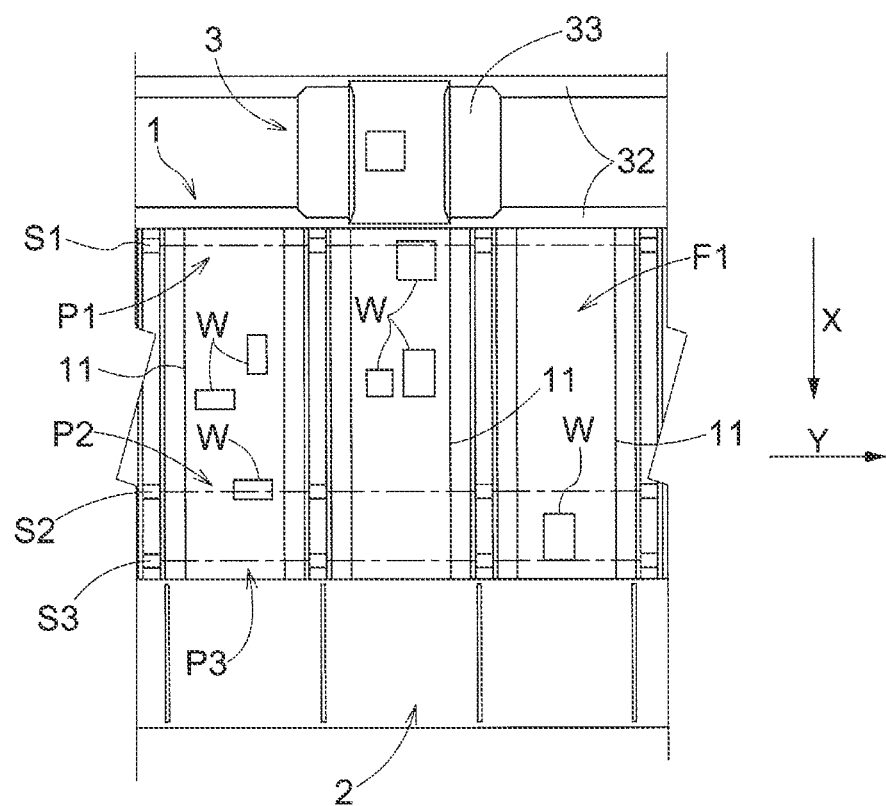
FIG. 9 is a plan view showing a picking system according to another embodiment.

(9) The above embodiment describes an example in which the first transport devices 1 are configured as conveyors that operate independent of each other, and are each provided with an upstream transport unit 11 and a downstream transport unit 12 that are arranged in the separation direction X. However, the present invention is not limited to such an example, and, as shown in FIG. 9, for example, the first transport devices 1 may be constituted by one conveyor (transport unit). If this is the case, it is preferable that each first transport device 1 is provided with at least one of: a first detection sensor 51 that detects an article W at a first set position P1 on the first transport surface F1; a second detection sensor S2 that detects an article W at a second set position P2 on the first transport surface F1; and a third detection sensor S3 that detects an article W at a third set position P3 on the first transport surface F1. In the example shown in FIG. 9, the first set position P1, the second set position P2, and the third set position P3 are set in this order in order from the upstream side to the downstream side in the transport direction (the separation direction X) on the first transport surface F1. The first set position P1 is set in an upstream end area in the transport direction on the first transport surface F1, and the first detection sensor 51 detects whether or not an article W has been put into the first transport device 1 from the multi-tier sorting device 3. The third set position P3 is set in a downstream end area in the transport direction on the first transport surface F1, and the third detection sensor S3 detects an article W immediately before being put into a second transport device 2 from the first transport device 1. For example, when an article W is about to be put into the second transport device 2 at an unintended time, the transportation of the article W by the first transport device 1 can be stopped based on the detection of the article W by the third detection sensor S3. The second set position P2 is set at a position close to the third set position P3 between the first set position P1 and the third set position P3 in the transport direction on the first transport surface F1, and the second detection sensor S2 detects a state immediately before an article W transported by the first transport device 1 reaches the third set position P3. For example, in a case where the first transport device 1 is to be paused before an article W is put into the second transport device 2 in order to put an article W into the second transport device 2 at an appropriate time, if an article W is detected by the second detection sensor S2, it is possible to provide a warning or the like (such as a warning sound) indicating that the article W is jutting out of the stop position. Note that the present invention is not limited to the above example, and the first transport device 1 may be provided with three or more conveyors (transport units) that are independent of each other.

(10) Note that the configurations disclosed in the above embodiments can be applied in combination with configurations disclosed in other embodiments unless no contradiction arises. Regarding other configurations, the embodiments disclosed in the present description are merely examples in all respects. Therefore, it is possible to make various modifications as appropriate within a range that does not deviate from the spirit of the present disclosure.

Overview of Above Embodiments

The following describes the picking system described above.

A picking system that collects a necessary article from among a plurality of articles stored and delivers the necessary article, the picking system including:
   a multi-tier sorting device that has ports in a plurality of tiers at different levels in a top-bottom direction, and is configured to sort and discharge each of the articles into one of the ports in the plurality of tiers;
   a plurality of first transport devices respectively corresponding to the ports in the plurality of tiers; and
   a second transport device configured to receive the articles from the first transport devices and transport the articles,
   wherein the plurality of first transport devices respectively have first transport surfaces, receive the articles discharged through the ports with use of the first transport surfaces, and transport the articles placed on the first transport surfaces in a separation direction away from the ports, and
   the second transport device has a second transport surface configured to be movable upward and downward, and in a state where the second transport surface is located at a height corresponding to a terminal end portion of the first transport surface of any one of the plurality of first transport devices, the second transport device receives the articles discharged from the terminal end portion of the first transport surface onto the second transport surface and transports the articles.

With this configuration, articles sorted by the multi-tier sorting device and discharged from a plurality of ports can be received and transported by first transport devices provided in correspondence with the plurality of ports. A plurality of articles transported by the plurality of first transport devices can be received and transported by the second transport device. As a result, the articles sorted by the multi-tier sorting device can be sequentially transported by the second transport device in units of article groups after the sorting. Therefore, with this configuration, it is possible to reduce work places for the next work to be performed on the sorted articles, to be a smaller number of specific places compared to the number of ports, and accordingly it is possible to improve work efficiency.

Here, it is preferable that
the multi-tier sorting device sorts each of the articles into one of the plurality of ports based on order information, and
the first transport devices discharge the articles to the second transport device in units of article groups that are each a group of a plurality of articles corresponding to an order.

With this configuration, it is possible to sort a plurality of articles to a plurality of ports based on order information, and it is possible to transport the plurality of articles that have been sorted, in units of article groups, which are each a group of articles corresponding to one order, with use of the second transport device. Therefore, with this configuration, it is possible to transport articles in units of article groups that have been sorted for orders respectively, with use of the second transport device. Therefore, it is possible to perform the next work for each article group, and improve the efficiency of the work.

It is also preferable that
the multi-tier sorting device has the ports in a plurality of rows at different positions in a width direction, where the width direction is a direction that intersects the separation direction in a plan view,
in the plurality of tiers, the plurality of first transport devices are arranged in the width direction in correspondence with the respective ports in the plurality of rows,
in the plurality of tiers, the second transport surface is provided in the width direction so as to extend along the terminal end portions of the plurality of first transport surfaces arranged in the width direction, and
the second transport device transports the articles in the width direction.

With this configuration, it is possible to receive articles sorted by the multi-tier sorting device for ports in a plurality of tiers and a plurality of rows using the first transport devices provided in correspondence with the plurality of ports, and transport the articles in the separation direction. Also, it is possible to receive the plurality of articles transported by the plurality of first transport devices and transport the articles in the width direction, with use of the second transport device. At this time, the second transport surface is provided in the width direction so as to extend along the terminal end portions of the plurality of first transport surfaces arranged in the width direction. Therefore, the articles transported by the plurality of first transport devices can be efficiently received by the second transport surface of the second transport device. In addition, it is possible to reduce the installation space for the second transport device.

It is also preferable that,
in each of the plurality of tiers, the second transport surface is provided so as to extend through an entire region in which the terminal end portions of the plurality of first transport surfaces are arranged in the width direction.

With this configuration, all of the plurality of first transport devices that are arranged in the width direction are targeted, and the articles discharged from all of the first transport devices can be received and transported by the second transport surface of the second transport device.

It is also preferable that
the second transport device transports the articles placed on the second transport surface, and
a container that receives and houses the articles discharged from the second transport device is provided below an end portion of the second transport surface in the width direction.

With this configuration, it is possible to put the articles transported by the second transport device into containers, at the end portion of the second transport surface. Therefore, it is possible to concentrate the work places where the next work is to be performed on the sorted articles to the position near the end portion of the second transport surface. As a result, it is also possible to improve work efficiency.

It is also preferable that
the second transport device is a trough conveyor in which a central portion of the second transport surface in a cross section orthogonal to a direction in which the articles are transported by the second transport device is recessed with respect to two side portions of the second transport surface.

With this configuration, it is possible to bring the articles closer to the central portion of the second transport surface while the articles are transported by the second transport device. As a result, it is possible to prevent articles from jutting out of the second transport surface while the articles are transported by the second transport device. Also, in the case of transporting the sorted articles for each article group, using the second transport device, it is possible to transport the article group in the state of being gathered in the central portion of the second transport surface. Therefore, it is easier to improve work efficiency when the next work is to be performed for each article group.

INDUSTRIAL APPLICABILITY

The technique according to the present disclosure is applicable to a picking system that collects a necessary article from among a plurality of articles stored and delivers the necessary article.

DESCRIPTION OF REFERENCE SIGNS

100: Picking System
1: First Transport Device
F1: First Transport Surface
E1: Terminal end portion
2: Second Transport Device
F2: Second Transport Surface
E2: End Portion
20: Central Portion
21: Side Portion
3: Multi-tier Sorting Device
31: Port
B: Container
W: Article
Gw: Article Group
X: Separation Direction
Y: Width Direction

The invention claimed is:
1. A picking system that collects a necessary article from among a plurality of articles stored and delivers the necessary article, the picking system comprising:

a multi-tier sorting device comprising ports arranged in a plurality of tiers at different levels in a top-bottom direction and a plurality of rows at different positions in a width direction within the plurality of tiers, and sorts and discharges each of the articles to one of the ports in the plurality of tiers;

a plurality of first transport devices respectively corresponding to the ports in the plurality of tiers, the plurality of first transport devices being arranged in the width direction in correspondence with the respective ports in the plurality of rows; and a second transport device configured to receive the articles from the first transport devices and transport the articles, wherein the plurality of first transport devices respectively have first transport surfaces, receive the articles discharged through the ports with use of the first transport surfaces, and transport the articles placed on the first transport surfaces in a separation direction away from the ports, wherein the width direction is a direction that intersects the separation direction in a plan view, wherein the second transport device has a second transport surface configured to be movable upward and downward and, in a state where the second transport surface is located at a height corresponding to a terminal end portion of the first transport surface of one of the plurality of first transport devices, the second transport device receives the articles discharged from the terminal end portion of the first transport surface onto the second transport surface and transports the articles, wherein, in the plurality of tiers, the second transport surface is arranged in the width direction so as to extend along the terminal end portions of the plurality of first transport surfaces arranged in the width direction, and wherein the second transport device transports the articles in the width direction.

2. The picking system according to claim 1, wherein the multi-tier sorting device sorts each of the articles into one of the plurality of ports based on order information, and wherein the first transport devices discharge the articles to the second transport device in units of article groups that are each a group of a plurality of articles corresponding to an order.

3. The picking system according to claim 2, wherein the second transport device is a trough conveyor in which a central portion of the second transport surface in a cross section orthogonal to a direction in which the articles are transported by the second transport device is recessed with respect to two side portions of the second transport surface.

4. The picking system according to claim 1, wherein, in each of the plurality of tiers, the second transport surface is provided so as to extend through an entire region in which the end portions of the plurality of first transport surfaces are arranged in the width direction.

5. The picking system according to claim 4, wherein the second transport device transports the articles placed on the second transport surface, and wherein a container that receives and houses the articles discharged from the second transport device is provided below an end portion of the second transport surface in the width direction.

6. The picking system according to claim 4, wherein the second transport device is a trough conveyor in which a central portion of the second transport surface in a cross section orthogonal to a direction in which the articles are transported by the second transport device is recessed with respect to two side portions of the second transport surface.

7. The picking system according to claim 1, wherein the second transport device transports the articles placed on the second transport surface, and wherein a container that receives and houses the articles discharged from the second transport device is provided below an end portion of the second transport surface in the width direction.

8. The picking system according to claim 7, wherein the second transport device is a trough conveyor in which a central portion of the second transport surface in a cross section orthogonal to a direction in which the articles are transported by the second transport device is recessed with respect to two side portions of the second transport surface.

9. The picking system according to claim 1, wherein the second transport device is a trough conveyor in which a central portion of the second transport surface in a cross section orthogonal to a direction in which the articles are transported by the second transport device is recessed with respect to two side portions of the second transport surface.

10. The picking system according to claim 1, wherein the second transport device is a trough conveyor in which a central portion of the second transport surface in a cross section orthogonal to a direction in which the articles are transported by the second transport device is recessed with respect to two side portions of the second transport surface.

* * * * *